(12) United States Patent
Fay, II et al.

(10) Patent No.: US 10,251,344 B2
(45) Date of Patent: Apr. 9, 2019

(54) HYDRAULIC DAMPING SYSTEM AND METHODS OF USING THE SAME

(71) Applicant: CNH Industrial America, LLC, New Holland, PA (US)

(72) Inventors: Jeffrey B. Fay, II, Wilmington, DE (US); Keith D. Myers, Lancaster, PA (US); Nicholas Gregory, Leola, PA (US)

(73) Assignee: CNH Industrial America LLC, New Holland, PA (US)

(*) Notice: Subject to any disclaimer, the term of this patent is extended or adjusted under 35 U.S.C. 154(b) by 114 days.

(21) Appl. No.: 15/395,806

(22) Filed: Dec. 30, 2016

(65) Prior Publication Data

US 2018/0186207 A1 Jul. 5, 2018

(51) Int. Cl.
| | |
|---|---|
| *F16F 1/00* | (2006.01) |
| *A01B 76/00* | (2006.01) |
| *A01D 75/00* | (2006.01) |
| *B60G 11/26* | (2006.01) |
| *B60G 17/015* | (2006.01) |
| *B60G 17/016* | (2006.01) |

(52) U.S. Cl.
CPC ............ *A01D 75/00* (2013.01); *B60G 11/265* (2013.01); *B60G 17/016* (2013.01); *B60G 17/0152* (2013.01); *F16F 1/00* (2013.01); *A01B 76/00* (2013.01); *B60G 2202/413* (2013.01); *B60G 2300/08* (2013.01)

(58) Field of Classification Search
CPC .. B60G 11/28; B60G 17/0152; B60G 17/016; B60G 11/265; B60G 2206/011; B60G 2300/08; B60G 2202/413; A01D 75/00; A01B 76/00
See application file for complete search history.

(56) References Cited

U.S. PATENT DOCUMENTS

| | | | |
|---|---|---|---|
| 4,178,007 A | 11/1979 | Martineau | |
| 6,533,319 B1* | 3/2003 | Denby et al. | 280/759 |
| 7,159,695 B2 | 1/2007 | Strong | |
| 8,020,648 B2 | 9/2011 | Otto | |
| 8,496,256 B2* | 7/2013 | Bebernes et al. | 280/86 |
| 8,690,171 B2* | 4/2014 | Clark | 280/86.751 |
| 9,168,784 B2 | 10/2015 | DeChristopher et al. | |
| 2005/0115746 A1* | 6/2005 | Dunn et al. | 180/6.2 |
| 2013/0075169 A1* | 3/2013 | Otto | 180/6.24 |
| 2014/0138165 A1* | 5/2014 | Bebernes et al. | 180/6.3 |
| 2015/0223386 A1 | 8/2015 | Nafziger et al. | |

FOREIGN PATENT DOCUMENTS

JP 11-042904 2/1999

* cited by examiner

*Primary Examiner* — Drew J Brown
(74) *Attorney, Agent, or Firm* — Patrick M. Sheldrake; Peter K. Zacharias

(57) ABSTRACT

The disclosure relates to a dampening system useful for reducing the shimmying or movement of caster on suspension systems of harvesters, such as self-propelled windrowers. The suspension system utilizes hydraulic cylinders on harvesters which are operably linked to the caster and that respond to movement of the caster and/or caster wheel during operation of the harvester in a high-speed operable mode.

21 Claims, 10 Drawing Sheets

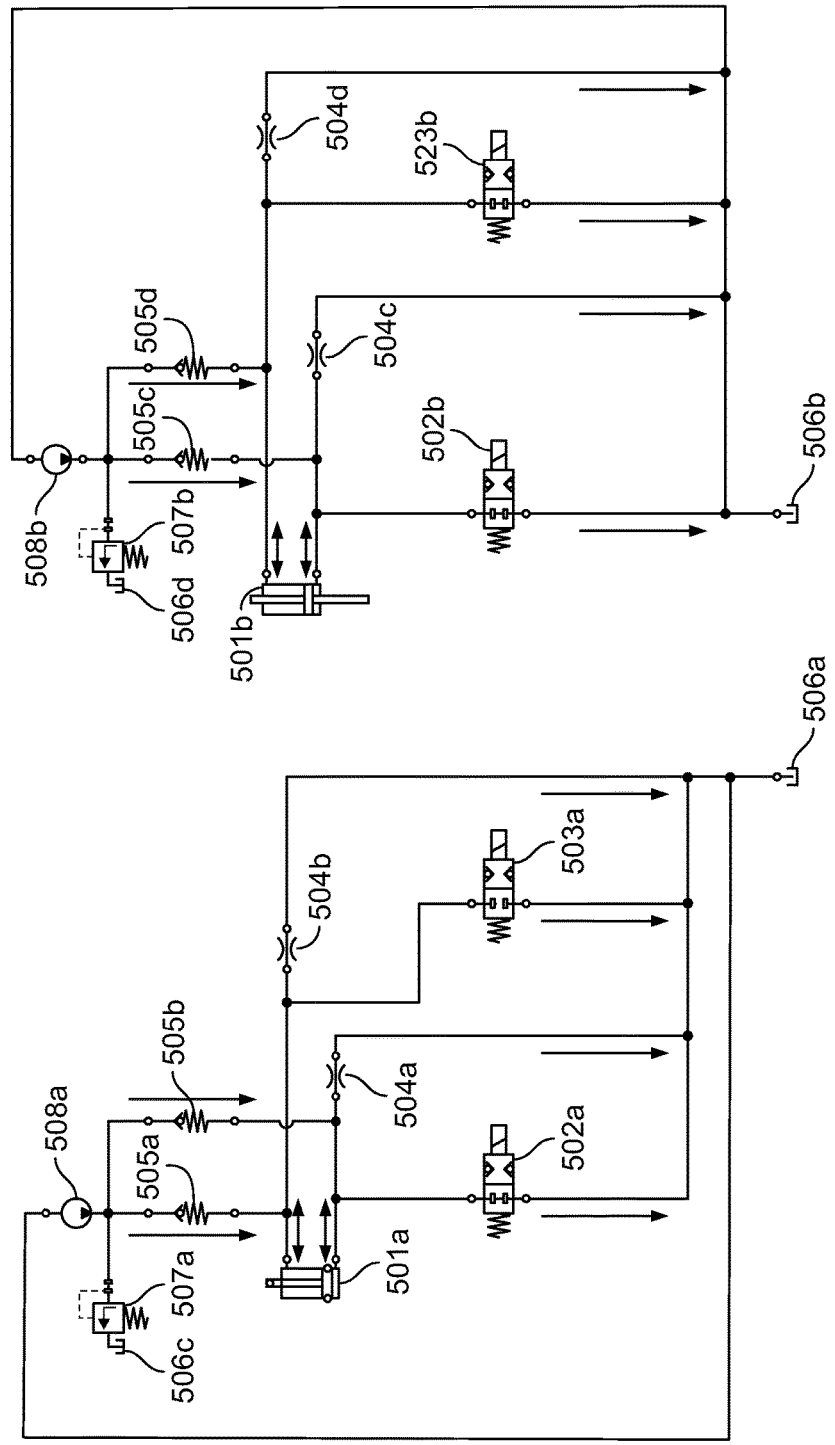

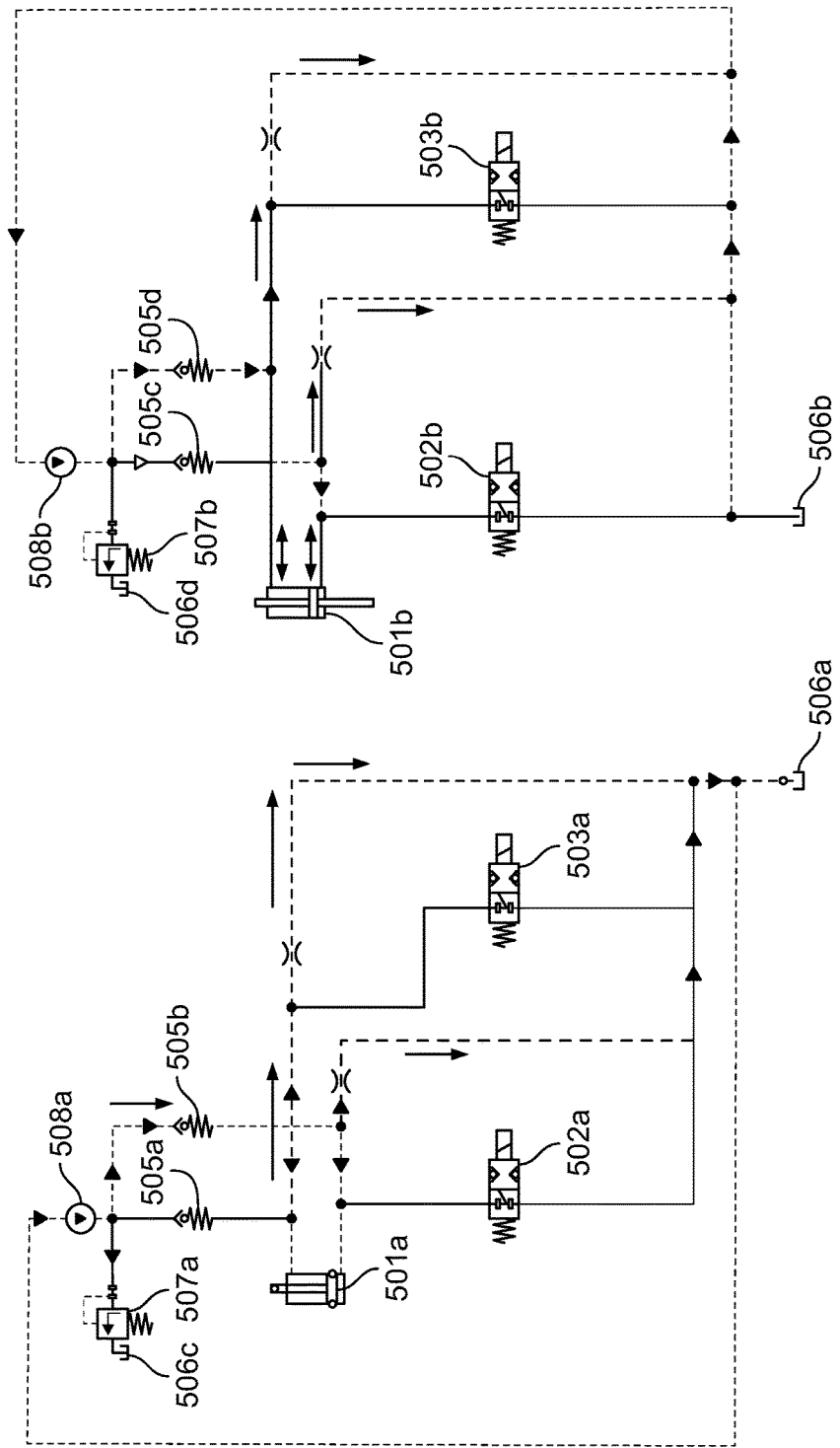

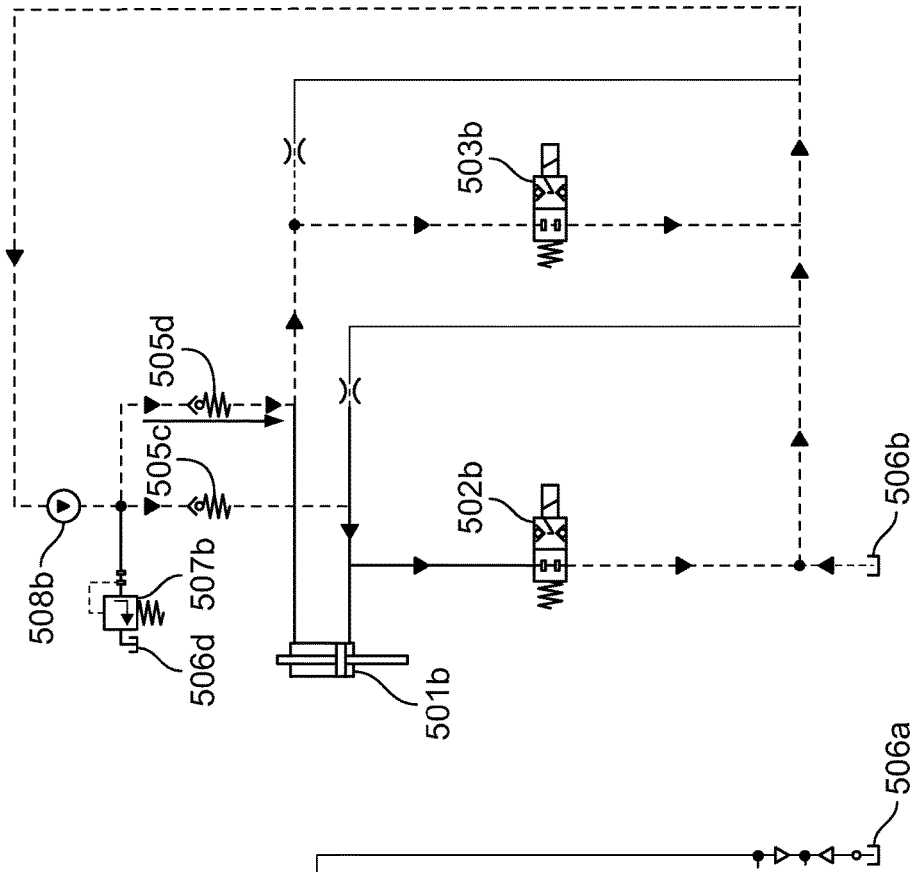
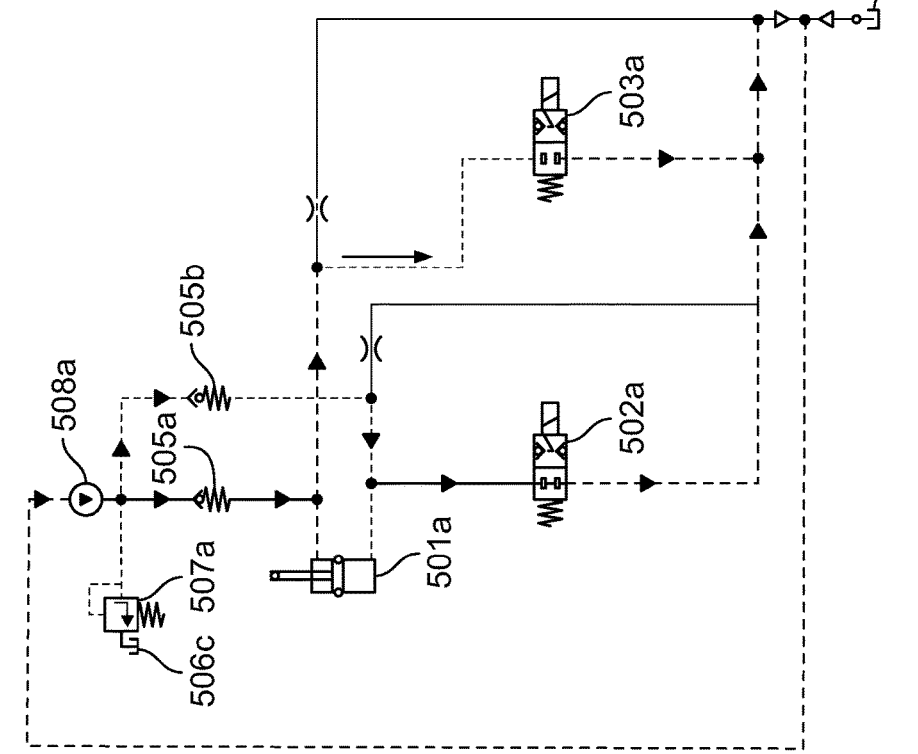
FIG. 7B
FIG. 7A

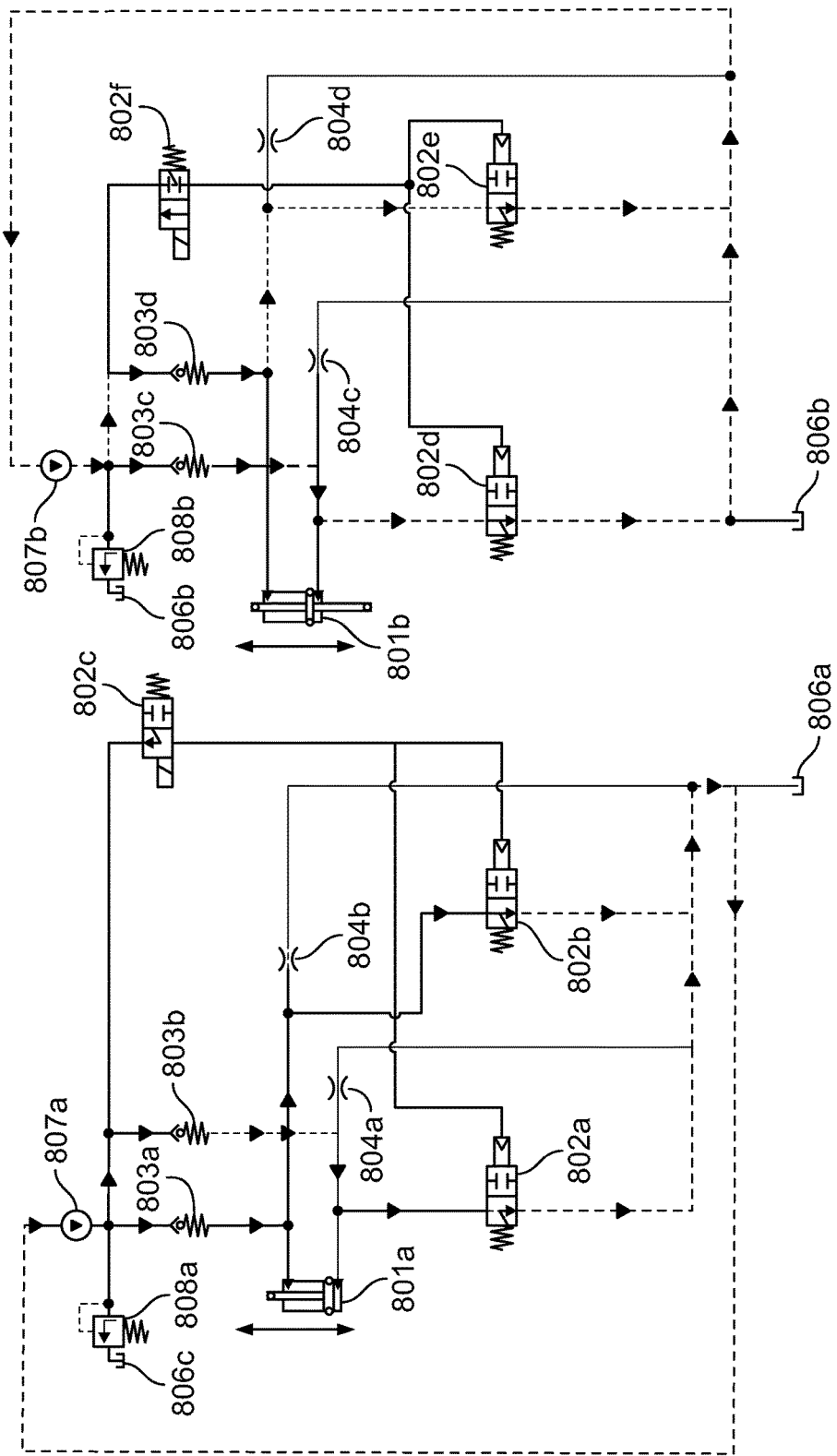

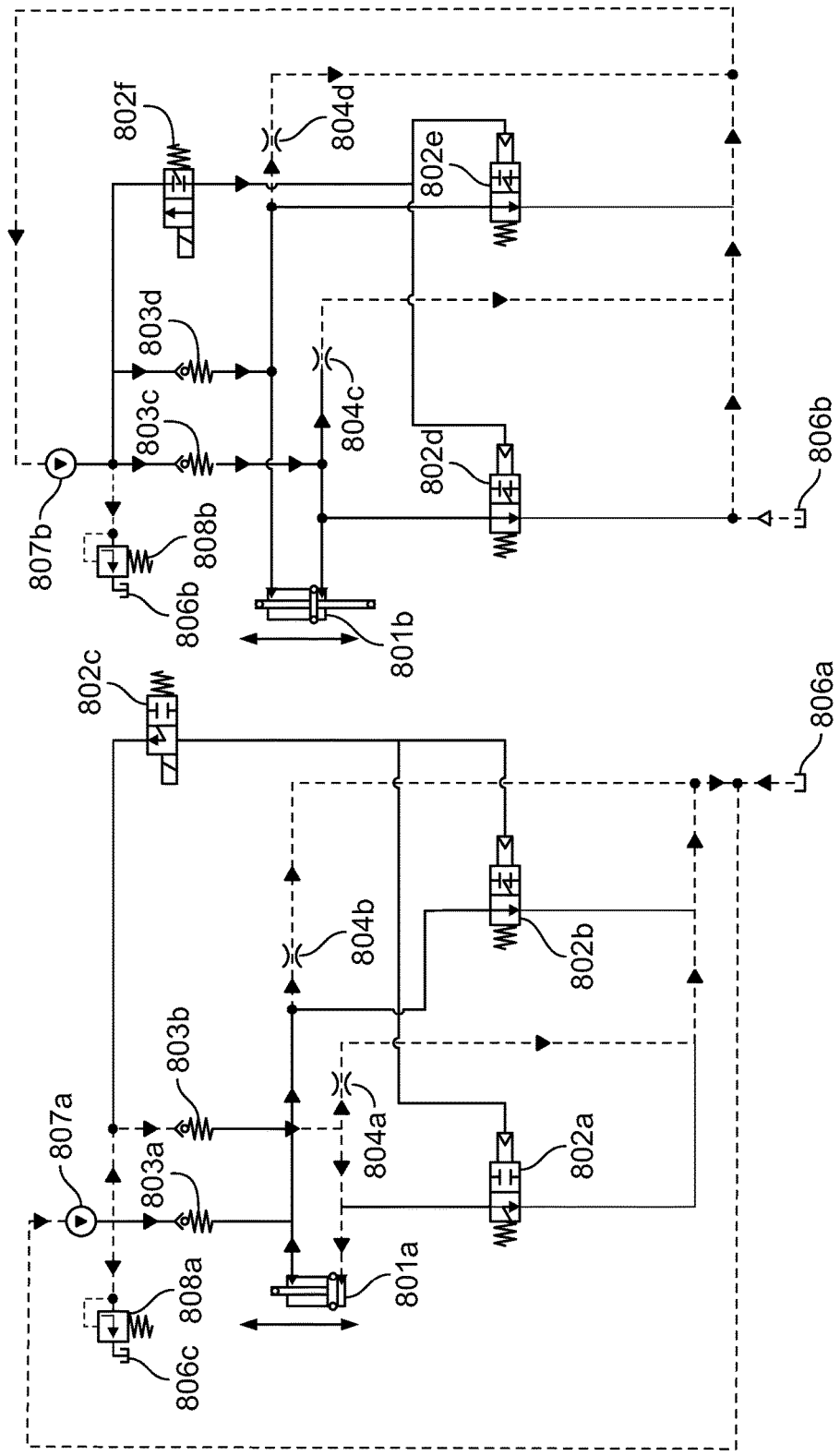

HYDRAULIC DAMPING SYSTEM AND METHODS OF USING THE SAME

TECHNOLOGY FIELD

The present disclosure relates generally to a hydraulic damping system configured for a harvester, such as a self-propelled windrower, capable of reducing vibration and excess movement of the harvester while the harvester operates in both a field (or harvesting) mode and high-speed mode.

BACKGROUND

Harvesters such as windrowers, tractors, and hay foresters have to balance functionality with weight distribution. On one hand, the harvester needs to include a hitch at the front of the vehicle so that it can attach a header or some other harvesting equipment. On the other hand, the harvesting equipment is very heavy when attached on the front of the vehicle. If the vehicle is operating with a header attachment, the shock absorbers must accommodate weight distributed on the front end of the vehicle. If the header is not attached to the vehicle, the weight distribution of the vehicle is altered dramatically on most current vehicle designs such that the front of a harvester may be elevated over a horizontal or substantially horizontal plane. This elevation makes it difficult to attach a header. The weight distribution to the rear of the vehicle can also cause vibration and shimmying across the rear axle or axels during a high-speed, or non-harvesting mode. Such vibration or shimmying can put undue stress on the rear suspension system.

Typical construction for such vehicles include front ground wheels mounted on the frame at fixed angles parallel to each other and parallel to a center line of the frame and rear ground wheels mounted on a respective castor. Each of the front ground wheels is typically driven by a respective drive motor which allows variable speed in both the first and second directions such that steering of the tractor is effected by a differential in speed between the front wheels with the rear wheels following the steering in a castoring action. A pair of damper cylinders are each connected between a bracket on a rear axle of the frame and a lever in the castor plane of the castor so as to provide a damping force tending to restrict rotation of the respective second wheel about the respective vertical pivot axis with the damping force at a maximum value when the rear wheels are parallel to the center line in either the forward or reverse directions.

Such hydrostatically driven vehicles used primarily for swathing are commonly used and readily available. The vehicles typically carry at a forward end on suitable sprung supports a header for cutting standing crop with the crop being transported on the header to a suitable discharge location generally centrally of the vehicle for forming a swath in the field from the cut crop.

Such vehicles generally include a pair of front wheels just behind the header which are fixed to the frame of the vehicles so that they remain at an angle parallel to each other and parallel to a center line of the tractor. The tractor is supported at the rear end by a pair of castor wheels which are attached to a cross axle pivotally connected to the frame at a center horizontal pivot point, commonly known as a walking beam. The axle is typically supported relative to the ground the castor wheels at the ends of the rear axle so that the wheels trail behind a vertical pivot mount for the wheels.

The front wheels only are driven and are driven in a manner which allows full control in the forward and reverse directions so that steering is effected by a differential speed between the two front wheels with the rear wheels following in the conventional castoring action.

It is also known that such vehicles can travel more effectively at high speed when reversed in direction so that the driven wheels are at the rear and the castor wheels at the front. The castor wheels of course rotate through 180° to trail behind the vertical pivot which is now forward of the castor wheels as the tractor moves at relatively high speed in this reversed direction.

Castor shimmy is an inherent problem on vehicles of the above type. Recent machines have been increased in speed up to a maximum road speed of 24 mph instead of 16 which is the standard in the industry. Speed aggravates the shimmy problem.

Loss of ground contact (going over bumps) also aggravates the problem and as a result weight is often added to prevent this. This results in increased power requirements and increased fuel consumption.

Many such vehicles use as the rear suspension of the rear castor wheels the simple pivoting rear axle or walking beam and while speeds have been relatively low, this has been acceptable. Of course the tires themselves also provide flexure which contributes to the suspension. However the use of only the tires as a suspension in rough terrain can cause sever pitching leading to significant fore and aft acceleration of the operator station.

SUMMARY OF EMBODIMENTS

The disclosure relates to a dampening system useful for reducing the shimmying or movement of caster on suspension systems of harvesters, such as self-propelled windrowers. The suspension system utilizes hydraulic cylinders on harvesters which are operably linked to the caster and that respond to movement of the caster and/or caster wheel during operation of the harvester in a high-speed operable mode. The disclosure also relates to a harvester comprising the dampening system disclosed herein comprising a pair of hydraulic cylinders in fluid communication with a hydraulic, such hydraulic cylinder mounted operably to a hydraulic mounting bracket which is mechanically connected to at least one axle. In some embodiments, the dampening system is operably linked to the rear axle. In some embodiments, the dampening system comprises one hydraulic cylinder operably linked to a single axel. In some embodiments, the harvester comprises a dampening system that comprises a pair of hydraulic cylinders or actuators (terms may be used interchangeably) operably linked to either end of a single axle of the harvester. If the axle configuration of the harvester uses suspended or non suspended double axles for the front or rear of the harvester, it should be noted that the suspension system or dampening system can comprise one hydraulic cylinder for each axle. In some embodiments, the harvester comprises a frame, a two, suspended axle (right hand side and left hand side) in the rear portion of the vehicle. In some embodiments, the rear wheel assembly is connected to the rear suspension system by a caster which is mechanically linked to each axle by the dampening system. In some embodiments, the caster is mechanically linked to the axle by a bracket with a vertically aligned pivot point allowing rotational movement about a vertical axis aligned to the pivot point in respect to the horizontal position of the harvester.

In some embodiments, the harvester is a windrower. In some embodiments, the harvester is a self-propelled windrower. In some embodiments, the harvester is a hay forager.

In other embodiments, the harvester is a lawn mower or vehicle that operates in high and low speed modes.

Movement of the caster can be dampened by passive movement of a single or double rod within a hydraulic actuator or cylinder that is in fluid communication to one or a plurality of hydraulic circuits. Hydraulic circuits of the disclosure include at least two hydraulic states: a first hydraulic state in which pressurized fluid from a reservoir (fluid source) to and from the hydraulic cylinders mechanically linked to the casters by one or more fastening elements (such as a mounting bracket) flows through the circuit unimpeded by one or a plurality of restrictive orifices. In a second hydraulic state, valves, arranged in parallel fashion to control fluid flow in and out of each cylinder fluid inlet, are closed and allow flow of pressurized fluid into parallel positioned restrictive orifices. The restrictive orifices create a slower rate of fluid flow to and form the hydraulic cylinders creating a cushioning or dampening force if the casters encounter a significant amount of movement. The dampening system in this second hydraulic state is most useful for harvesters being operated in a high-speed mode where shimmying or a greater degree of movement of the caster is typically experienced. In some embodiments, the caster movement determines when the hydraulic state transitions from a first to a second hydraulic state. In some embodiments, the suspension system is in operable communication with one or more sensors that detects the degree of movement of the caster by its position relative to one or more axles to which the caster is operably attached. In some embodiments, the dampening system comprises a controller optionally comprising one or more memories accessible by an operator in the cab. The operator can toggle operable modes of the harvester to and from a field or harvesting mode to a high-speed mode. The selection of such modes in the system causes the hydraulic state to transition from a first hydraulic state to a second hydraulic state, enabling high dampening force on the suspension system when operating in high-speed operable mode. The operator selection also allows for low or negligible dampening force in a field operation mode, where shimmying on uneven ground is more greatly tolerated or expected.

The disclosure also relates to a kit comprising at least one hydraulic cylinder, a hydraulic cylinder mounting bracket configured for attachment to an axle of a harvester. In some embodiments, the kit optionally comprises a software program product with executable code that directs transition of the hydraulic cylinder from a first hydraulic state to a second hydraulic state disclosed herein. In some embodiments, the kit comprises ay leas tone fluid adaptor configured for attachment to a pressurized fluid source, thereby enabling fluid communication between the pressurized fluid source of the harvester and the one or plurality of hydraulic cylinders. In some embodiments, the kit optionally comprises a software program product with executable code that directs transition of the hydraulic cylinder from a second hydraulic state to a first hydraulic state disclosed herein in synchrony with a transition of the harvester from a first operable mode (low speed mode) to a second operable mode (high-speed mode). It should be noted that reverse transition from one state to another hydraulic state should be relatively simple by operator selection of switch or signal from a controller in electronic communication with an electronic system within the harvester or signal from a remote point but sent via internet uplink.

BRIEF DESCRIPTION OF THE DRAWINGS

FIG. 5A depicts a static image of a hydraulic circuit for the rear suspension system of an embodiment including a single-rod hydraulic cylinder utilizing a pair of solenoid valves. FIG. 5B depicts a static image of a hydraulic circuit for the rear suspension system of a harvester embodiment including a double-rod hydraulic cylinder.

FIGS. 6A and 6B depict the same hydraulic circuit of FIGS. 5A and 5B, respectively, but in a configuration designed for high-speed operation of the embodiment.

FIGS. 7A and 7B depict the same hydraulic circuit of FIGS. 5A and 5B, respectively, but in a configuration designed for field operation (lower speed as compared to the high-speed mode) of the embodiment.

FIG. 8A depicts a static image of a hydraulic circuit for the rear suspension system of a harvester embodiment including a single-rod hydraulic cylinder. FIG. 8B depicts a static image of a hydraulic circuit for the rear suspension system of a harvester embodiment including a double-rod hydraulic cylinder. In each figure, solenoid valves have been replaced by pilot valves. The configuration is designed for a field operation mode.

FIGS. 9A and 9B depict the same hydraulic circuit of FIGS. 8A and 8B, respectively, but in a configuration designed for high-speed operation of the embodiment harvester.

DETAILED DESCRIPTION OF THE DISCLOSURE

Figure 1:
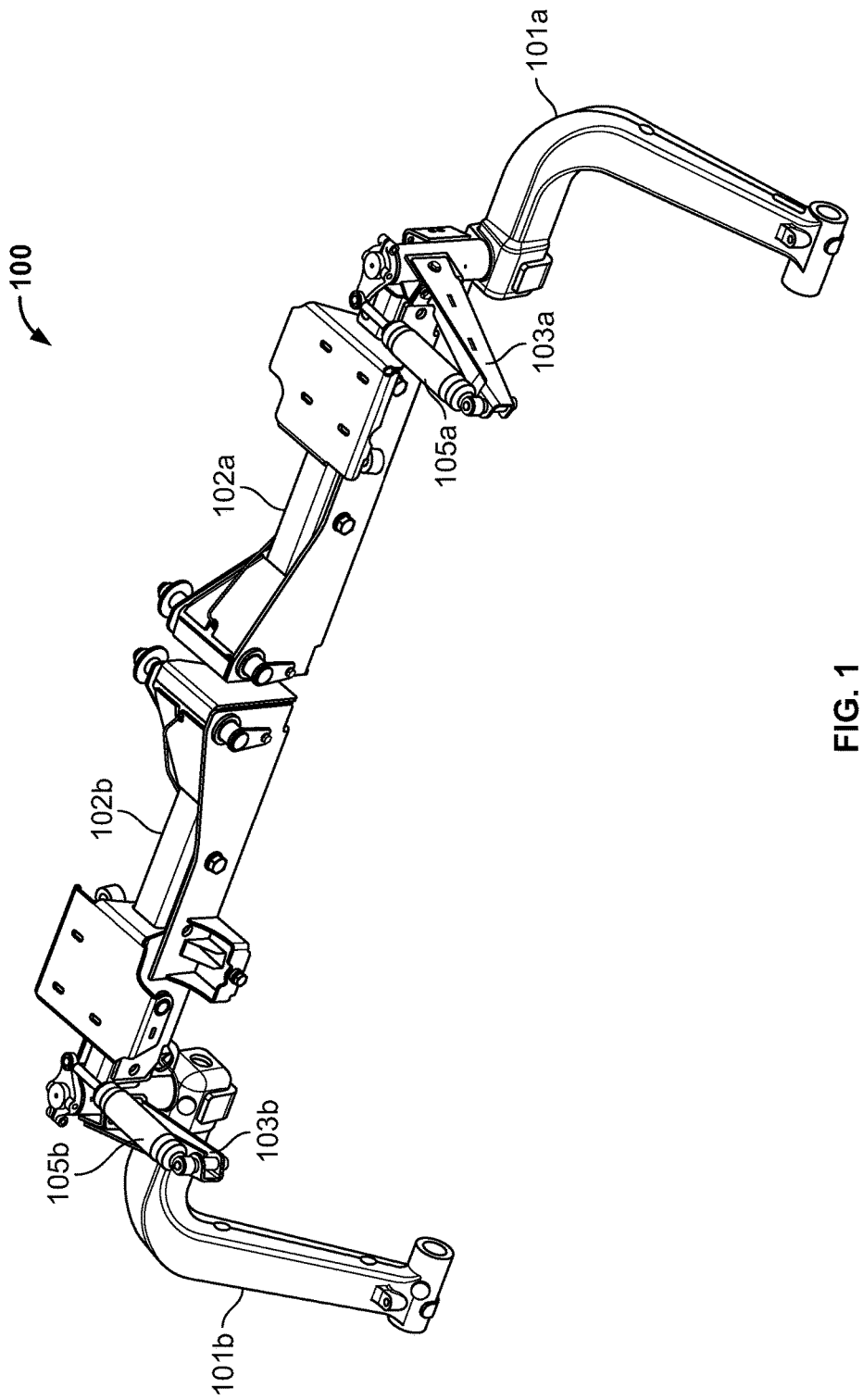
FIG. 1 depicts an isometric image of a conventional rear suspension system designed for a windrower.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1. In some embodiments, the term "plurality" mean 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a hay forager, lawn mower or a combine comprising a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "damper" as used herein is defined as any device that deadens vibrations or movement of a mechanical component or assembly.

The term "suspension system" as used herein is defined as an assembly or mechanical arrangement that cushions the ride of a harvester. In some embodiments, the suspension system comprises shock absorbers that are hydraulic cylinders comprising pressurized fluid inlet/outlet and one or a plurality of fluid lines in fluid communication with a pressurized fluid reservoir. The disclosure generally relates to a rear suspension system designed for a harvester. In some embodiments, the harvester is a self-propelled windrower.

The term "information" as used herein is defined as data values attributed to parameters. In some embodiments, information is digital and/or analog information. In some embodiments, information is the current operable mode of the harvester. In some embodiments, information is the current speed range selected by the operator of the harvester. In some embodiments, information is whether the harvester is in a first or second hydraulic state. In some embodiments, warning information can be audio and/or visual information. In some embodiments, information comprises whether the casters operably linked to an axle are moving during operation of the harvester in one or a plurality of operable modes. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester comprises a software system with executable code that executes a first or second hydraulic state based operator selection of a speed range to operate the harvester. In some embodiments, the disclosure also relates to a computer software product with executable code that automatically toggles between or through at least a first or second hydraulic state based operator selection of a speed range to operate the harvester. In some embodiments, the disclosure relates to the above-identified software and at least one or suspension systems comprising at least one hydraulic cylinder operably connected to a hydraulic circuit configured for retrofitting the suspension system to the caster shock absorbing system of previously purchased or leased harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system comprising a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about the operation speed of the harvester or a predetermined value or value around when the harvester should transition from a first or second hydraulic state. The software program product may be manually set or set for manual transition or automatic transition depending upon at least one of the following: (i) movement or vibration of one or a pair of casters; (ii) speed of the harvester at or over or under a predetermined value or range; or (iii) position of the caster relative to the incline, horizontal and/or speed of the harvester. If the software program product executes code to transition between a first and second hydraulic state based upon movement of the casters, the system or kit embodiments disclosed herein may comprise a sensor or sensors designed to monitor the vibration of the caster. In such harvester embodiments, the harvester comprises one or more sensors that are in electronic communication with a controller and optionally a display visible to an operator in the cab of the vehicle. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system comprising executable software program product configured for sending and receiving information about the movement of a caster from one position or alignment to a second position or alignment. The system may process this information, optionally store it and then execute code to transition the hydraulic circuit from a first to a second hydraulic state. In some embodiments, the system may be configured by the operator to transition the harvester from a first to second hydraulic state in synchrony or substantial synchrony to operator-initiated transition from a first to a second operable mode of the harvester. In some embodiments, the data processing system of the harvester transitions the harvester from a first to second hydraulic state in synchrony or substantial synchrony to operator-initiated transition from a first to a second operable mode of the harvester. In some embodiments, the data processing system of the harvester transitions the harvester from a first to second hydraulic state in synchrony or substantial synchrony to operator-initiated transition from a first to a second operable mode of the harvester depending upon real-time information sent to a controller by a sensor that monitors the real-time movement and/or position of one or a pair of casters in electronic communication with the data processing system.

The term "real-time" and the phrase "in real-time" as used herein are defined as a way of describing a process, event, or action that occurs simultaneously with the process of actively operating a harvester. In some embodiments, various sensors, for example a speed sensor, continuously sense information about the speed of the harvester and transmit that information to a controller in real-time. In some embodiments, an operator may adjust values or thresholds for one or more hydraulic states in real-time through the operator interface by accessing the system electronically and inputting one or a plurality of values.

In some embodiments, the system or harvester of the disclosure comprises one or more position sensors. As disclosed in the above paragraph, vibration or movement of the casters on the harvesters can trigger transition from one hydraulic state to a second hydraulic state. The tolerance for how much movement is necessary to trigger the transition can be manually inputted by the operator of the data processing system comprising the one or more position sensors. In some embodiments, the determination of whether a caster has reached the pre-determined position is within the error range of the sensors and controllers involved in the determination. In some embodiments, the determination of whether a caster has reached the pre-determined position or reached a pre-determined position with a certain amount of frequency is within ±10% of the pre-determined position and frequency value. In some embodiments, an operator determines the pre-determined position and/or frequency values. In some embodiments, a controller or other software program determines the pre-determined position and/or frequency values. In some embodiments, an operator provides the pre-determined position and/or frequency values via an operator interface that is in electronic communication with one or more controllers. In some embodiments, a combination of an operator and a controller or other software program determines the pre-determined position and/or frequency values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648: that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a non-self-propelled windrower, a hay forager, and a lawn mower. Embodiments of the present disclosure are particularly well suited, but in no way limited to, use with any vehicle with a rear axle suspension system. In some embodiments, the vehicle comprises two operable modes: a first operable mode in which the vehicle operates within a low speed range and a second operable mode in which the vehicle operates at a high-speed mode. In the high speed mode, increased mechanical stress and increased forces may require a dampening system to reduce vibration or other stress on the mechanical components of the vehicle. In a windrower, for instance, high speed cause shimmying in the rear suspension system which negatively affects operation half-life of the equipment.

The disclosure also relates to a method of dampening vibration or shimmying in a harvester by utilizing any of the disclosed rear suspension systems disclosed herein. In some embodiments, the disclosure relates to a method of harvesting crop material utilizing any of the harvesters disclosed herein. In some embodiments, the method comprises transitioning the harvester from one disclosed operable mode to a second operable mode in synchrony with or substantial synchrony with transition from one disclosed hydraulic state to a second hydraulic state. The harvesting method, in some embodiments, comprises step comprises repeating steps (c) to (g) once twice, thrice or more. In some embodiments, the steps of the method are repeated as desired by an operator, for example an operator stops the harvester when all of the crop has been harvested or if the harvester run out of bale wrapping material. In some embodiments, preventing entry of crop material into a crop supply chamber in step (b), allowing entry of crop material into the crop supply chamber in steps (d) and (g), and ejecting crop material from the crop supply chamber in step (f) are performed by the synchronous movement of a control plate and/or a rear wall. In some embodiments, the aforementioned steps are synchronously performed but the movement is independently variable based upon the settings of the operator.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers.

Figure 2:
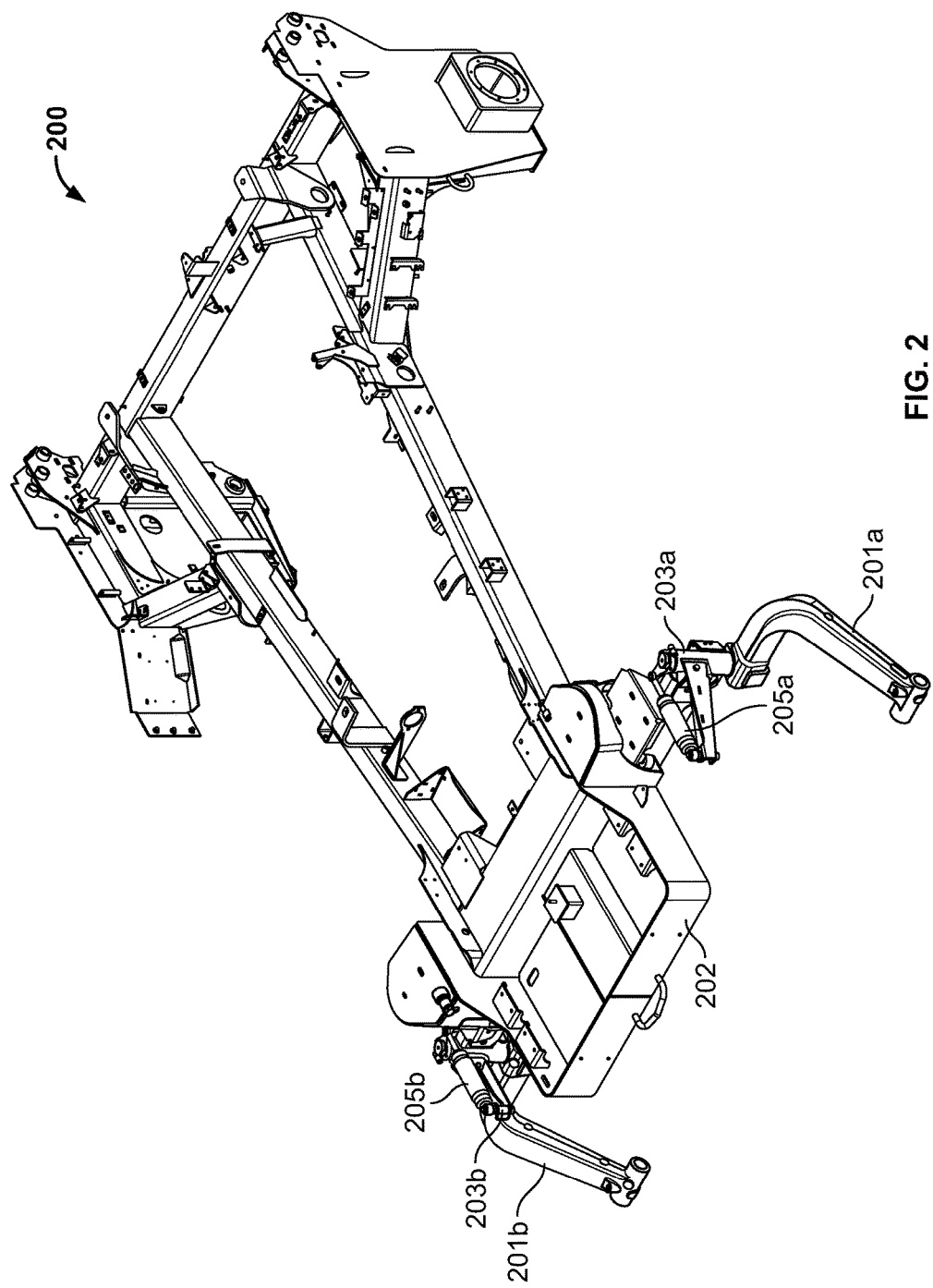
FIG. 2 depicts an isometric image of a conventional rear suspension system attached to the frame of a windrower.

Referring to the figures, FIG. 1 depicts an example of the rear suspension system 100 of a windrower. The suspension system 100 comprises two suspended left hand and right hand suspension assemblies. Each assembly comprises an axle 102a, 102b operably attached to a caster 101a, 101b through a caster shock absorber which comprises a shock mounting bracket 103a, 103b and a shock or fixed cylinder 105a 105b. The casters 101a 101b are typically operably connected to a rear wheel assembly that includes a wheel and tire (not shown) fixed to the bottom portion of the caster 101a 101b and allow some pivotal movement of the rear wheel and rear tire about a vertical axis that coincides with the attachment to the bottom portion of the casters 101a 101b. FIG. 2 depicts a rear suspension system mechanically attached to a frame 200 of the windrower. The rear suspension system includes a right hand caster 201a, a right hand shock mounting bracket 203a and a right hand shock absorber or shock cylinder 205a. The right and left hand axles (not shown) are operably attached to the frame 200 by a plurality of fastening elements, which in this configuration, allow for a suspended left and right handed axle. Oppositely positioned of the right hand caster, the left hand axle is operably attached to the left hand caster 201b, left hand shock mounting bracket 203b and the left handed shock absorber or shock cylinder 205b. The left and right hand shock mounting brackets 203a 203b allow simple attachment of the shock cylinders 205a 205b to the axles by simple bolt or fastener connection. A ballast box 202 is part of the main frame 200 of the windrower and provides balance to the rear portion of the vehicle.

At high speed operation (as shown in a harvesting direction diagonally upward to the right on the page), the casters are susceptible to shimmy causing vibration of the windrower that can disrupt operation of the vehicle and cause undue stress on mechanical components, especially those components in the rear suspension system. While shock absorbers 105a 105b are attached to the left and right hand rear axles 102a 102b to dampen the affects of the shimmying, the problem is not adequately addressed by the rear suspension system 100.

Figure 3:
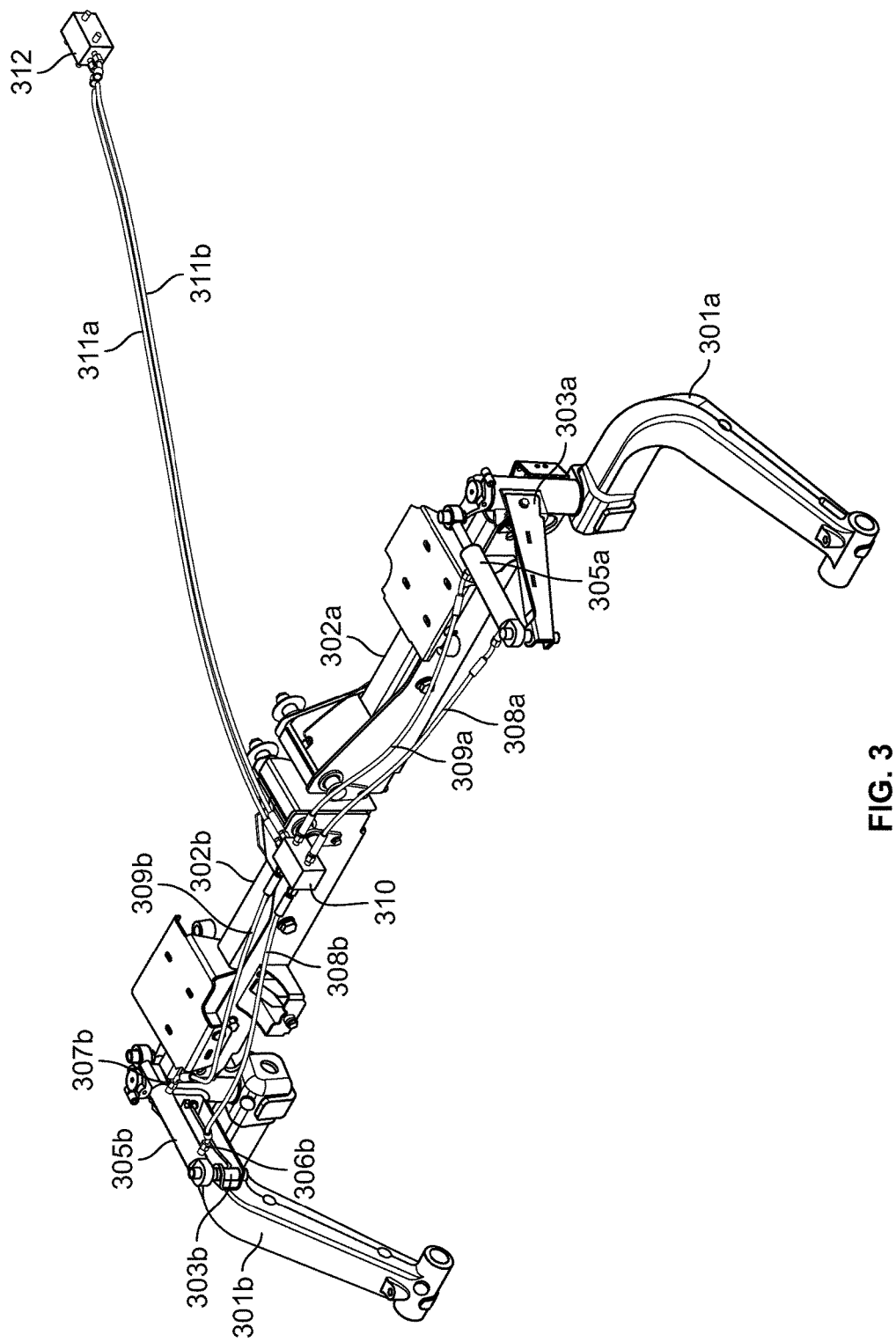
FIG. 3 is an isometric image of an embodiment depicting a rear suspension system designed for a windrower including a hydraulic cylinder as a shock absorber for a caster.

FIG. 3 depicts an isometric embodiment of the disclosure and a modified rear suspension system oriented similar to FIGS. 1 and 2 where rear portion of the suspension system is facing diagonally down and to the left of the page, while normal operation of the vehicle would continue diagonally upward and to the right of the page. The rear suspension system comprises a left-handed suspended axle 302b and right handed suspended axle 302a, each of which are mechanically attached respectively to a left handed or right handed caster shock absorber comprising a shock mounting bracket 303a 303b and a hydraulic cylinder 305a 305b. The right handed caster 301a and the left handed caster 301b are operably connected to the axles by the caster shock absorber system. Each of the left 305b and right-handed hydraulic 305a cylinders are attached to the respective axles 302b 302a by the shock mounting brackets 303b 303a by simple fasteners such as bolts or screws. A hydraulic circuit manifold 310 is positioned centrally on top of the rear suspension system with hydraulic lines 308a 309a connecting the manifold 310 to the right handed hydraulic cylinder 305a and with hydraulic lines 308b 309b connecting the manifold to the left handed hydraulic cylinder 305b. Each of the hydraulic lines 308a 308b 309a 309b are in fluid communication with the hydraulic actuators 305a 305b at fluid inlets 306b 307b positioned at either end of the hydraulic cylinders 305a 305b and each of the lines is capable of feeding or returning pressurized fluid (such as oil) to and from the manifold 310 and to and from the hydraulic cylinders 305a 305b. The hydraulic circuit manifold 310 is further connected to a pressurized fluid reservoir and pump (not depicted) through the hydraulic lines 311a and 311b which are connected to the reservoir and pump through a fluid adaptor 312.

Figure 4:
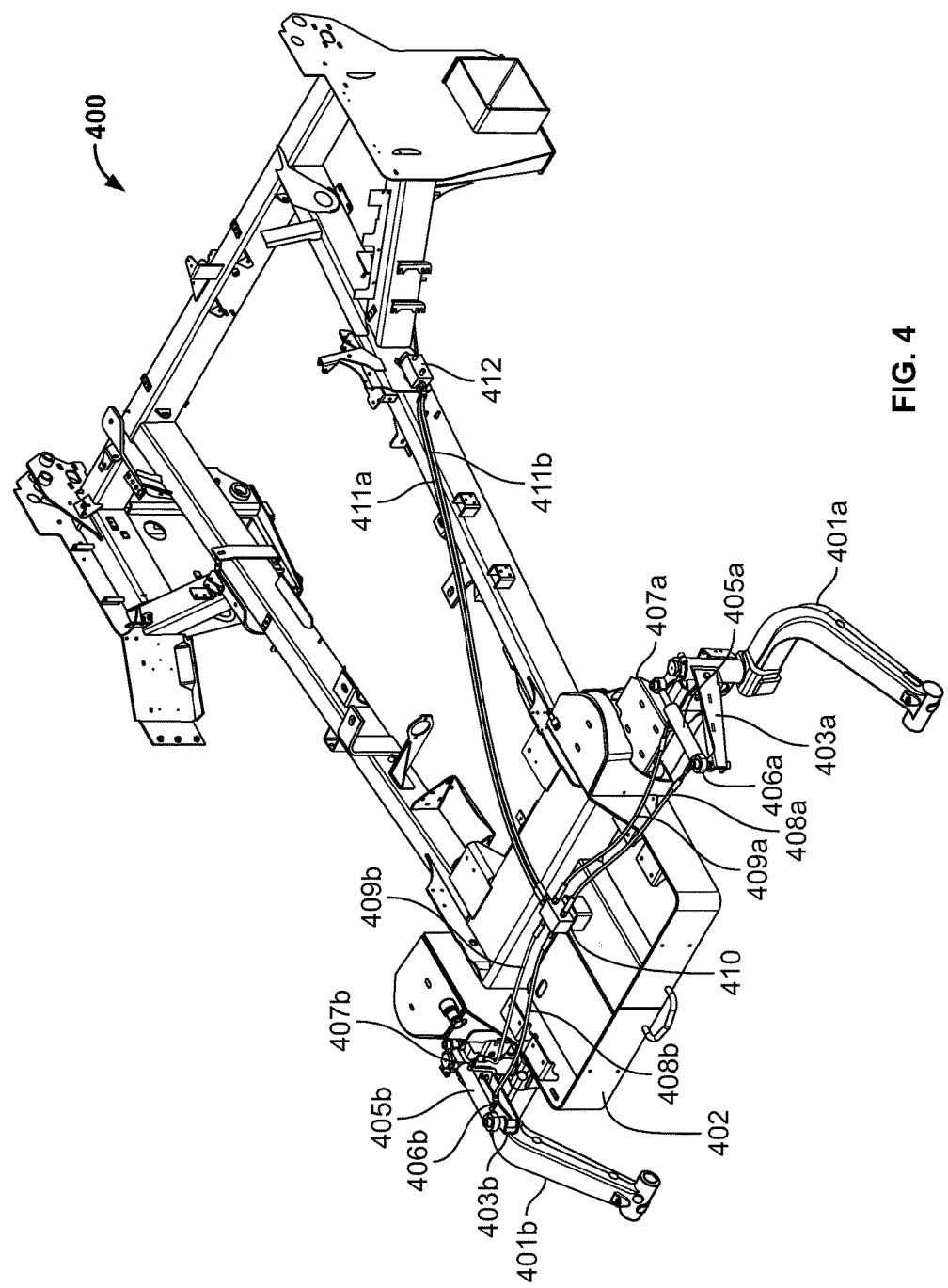
FIG. 4 is an isometric image of an embodiment including a rear suspension system designed for a windrower, including a hydraulic cylinder as a shock absorber for a caster, operably linked to a frame of the windrower.

It should be noted that while FIGS. 3 and 4 depict suspended right and left-handed axles, the embodiments of the disclosure relate to any rear suspension system attached to any single or double axle, suspended or non-suspended. In some embodiments, the rear suspension system comprises a single axle and the caster shock absorber system is positioned at either end of the single axle in a fashion substantially similar to what is depicted, although one of ordinary skill in the art could readily appreciate changes to ways in which the axle and the caster could be operably connected differently with different positions of fasteners and different positions of the shock absorbing systems.

FIG. 4 depicts a three dimensional image in isometric orientation of a rear suspension system operably attached to a main windrower frame 400. A left-handed and right-handed suspended axles are not visible and positioned underneath the ballast box 402 of the windrower frame 400. A right handed portion of the rear suspension system comprises a caster 401a, a hydraulic mounting bracket 403a, and a hydraulic cylinder 405a. A left handed portion of the rear suspension system comprises a left-handed caster 401b a left-handed hydraulic mounting bracket 403b and a left side hydraulic cylinder 405b. Each of the hydraulic cylinders are in fluid communication with the hydraulic circuit manifold 410 that is positioned above the main frame 400 on a central area of the ballast box 402. Hydraulic fluid lines 408a 408b 409a 409b run from the hydraulic circuit manifold into opposite ends of the hydraulic cylinders 405a 405b at inlet points. Rear inlet points 406a 406b feed and return pressurized fluid from the rear side of the hydraulic actuators 405a 405b. Front inlet points 407a 407b feed and return pressurized fluid from the rear side of the hydraulic actuators 405a 405b. Hydraulic fluid lines 411a 411b run from the hydraulic circuit manifold 410 to a reservoir and pressurized fluid pump within the windrower (not pictured). Attachment of the hydraulic fluid lines 411a 411b to the main frame 400 and into the reservoir are accomplished by the hydraulic fluid adapter 412 that is positioned adjacent to or substantially adjacent to the front section of the frame 400.

FIG. 5A and FIG. 5B depict a exemplary hydraulic circuit that feeds the hydraulic fluid from a reservoir to a single 501a or double-rod hydraulic actuator 501b. Heavy arrows depict the direction in which pressurized fluid may flow through the circuit. The hydraulic actuators 501a 501b receive fluid at either inlet point on either end of the cylinders causing, in this depiction, movement of the rods up and down in the page. This is a general schematic showing direction of fluid flow without consideration of valve position. Pressurized fluid is stored in reservoirs 506a 506b 506c 506d and fed through the hydraulic circuit by a pump 508a 508b and parallel positioned check valves 505a 505b 505c 505d. A relief valve 507a 507b is positioned in series with the reservoir not to Solenoid valves 502a 503a 502b 503b are also in parallel position feeding either end of the hydraulic cylinders 501a 501b. Two restrictive orifices 504a 504b (or 504c 504d in FIG. 5B) are also in parallel positions within the circuit and placed in parallel in respect to the solenoid valves 502a 503a or 502b 503b. The pressurized fluid can flow from the cylinder to the reservoir through open valves and will not flow back through the orifices. This hydraulic circuit allows for pressurized fluid to be drawn from the pump with fluid displaced on the other side of the bore pushed through the other orifice.

FIG. 6A depicts the same hydraulic circuit of FIG. 5A but with the solenoid valves closed. FIG. 6B depicts the same hydraulic circuit as FIG. 5B but with the solenoid valves closed. FIGS. 6A and 6B depict a first When the solenoid valves are closed pressurized fluid to and from the hydraulic cylinder 501a 501b is diverted away from the solenoid valves and instead through restrictive orifices 504a 504b (or 504c 504d in FIG. 5B). The restrictive orifice slows the flow of pressurized fluid in the system and creates a hydraulic state in which there is significantly less pressure in the hydraulic actuator. The slower flow creates a cushioning effect throughout the system and in the rear suspension system, thereby dampening the vibration and shimmying in the rear suspension of the harvester. This hydraulic state is most useful in a high speed operable mode of the harvester during which the harvester may be driving on paved roads, as an example, to and from harvesting points. In the single rod circuit of FIG. 6A, the orifice on the barrel end of the circuit will be larger to accommodate and provide equal force created by smaller piston area. The caster coupled to the hydraulic cylinder in the suspension system is able to move passively in response to the road. In some embodiments, pressurized fluid in the circuit flows in and out of the cylinders based upon movement of the caster and/or caster wheels operably attached to the casters.

FIG. 7A depicts the same hydraulic circuit of FIG. 5A but with the solenoid valves open. FIG. 7B depicts the same hydraulic circuit as FIG. 5B but with the solenoid valves open. When the solenoid valves are open, pressurized fluid (flowing with the position and direction of the arrowheads) flows through the solenoid valves and is diverted from the restrictive orifices. This creates a very low dampening force that is exerted through passive movement of the hydraulic cylinders or actuator coupled to the caster. In some embodiments, pressurized fluid in the circuit flows in and out of the cylinders based upon movement of the caster and/or caster wheels operably attached to the casters. This hydraulic circuit depicts a hydraulic state of the harvester in operation. Because of the low dampening force, this hydraulic state is often useful when synchronized to or substantially synchronized to harvesting or filed operable modes. The shimmying or reduced dampening is useful when the harvester is traveling over non uniform surfaces, such as a field.

FIG. 8A depicts a hydraulic circuit similar to the arrangement and activity of the hydraulic state depicted in FIG. 7A, except that solenoid valves have been replaced with pilot valves in connection with a single-rod hydraulic cylinder 801a. FIG. 8B depicts a hydraulic circuit similar to the arrangement and activity of the hydraulic state depicted in FIG. 7B, except that solenoid valves have been replaced with pilot valves in connection with a double-rod hydraulic cylinder 801b. In this first exemplary hydraulic state, reservoirs 806a, 806b, 806c, 806d supply pressurized fluid in the circuit. Caster wheel movement and/or caster movement can dictate when a pump 807a, 807b are utilized to feed pressurized fluid through the circuit and into either end of the hydraulic cylinders 801a, 801b. FIGS. 8A and 8B depict a hydraulic state most useful for a harvester in an operable mode suitable for field operation. Fluid passes through the check valves 803a, 803b, 803c, 803d. A relief valve 808a, 808b prevents too much build up of pressure through the circuit due to pressure delivery from the pump 807a, 807b. Check valves 803a and 803b are oriented in parallel fashion to accommodate fluid flow into either end of the hydraulic cylinder 801a. Similarly, check valves 803c and 803d are oriented in parallel fashion to accommodate fluid flow into either end of the hydraulic cylinder 801b. Restrictive orifices 804a, 804b, 804c, 804d are positioned within the circuit to reduce the flow of pressurized fluid if utilized. In this particular hydraulic state, pressurized fluid is diverted form the restrictive orifices and through pilot valves 802a, 802b, 802c, 802d, 802e, 802f, allowing passive movement of the hydraulic cylinders 801a, 801b with less dampening force. When the caster wheel or caster moves, the hydraulic fluid may be altered to create a low dampening effect in the rear suspension system.

FIG. 9A depicts the hydraulic circuit from FIG. 8A, except that the single rod of the hydraulic cylinder 801a is passively moved through pressurized fluid passing through the restrictive orifices 804a, 804b. FIG. 9B depicts the hydraulic circuit from FIG. 8B, except that the double rod of the hydraulic cylinder 801b is passively moved through pressurized fluid passing through the restrictive orifices 804c, 804d. In this second hydraulic state, pressurized fluid passes through open pilot valve 802c or 802f, but flow is diverted from pilot valves 802a and 802b, on one hand, and pilot valves 802d and 802e, on the other hand. The restricted flow creates passive movement of the cylinder in response to the caster wheel and/or caster movement and a high dampening effect. This hydraulic state is useful for high-speed operable modes of the harvester such that strong shimmying and vibration associated with gaster speed is more greatly dampened by the hydraulic circuit.

Figure 10:
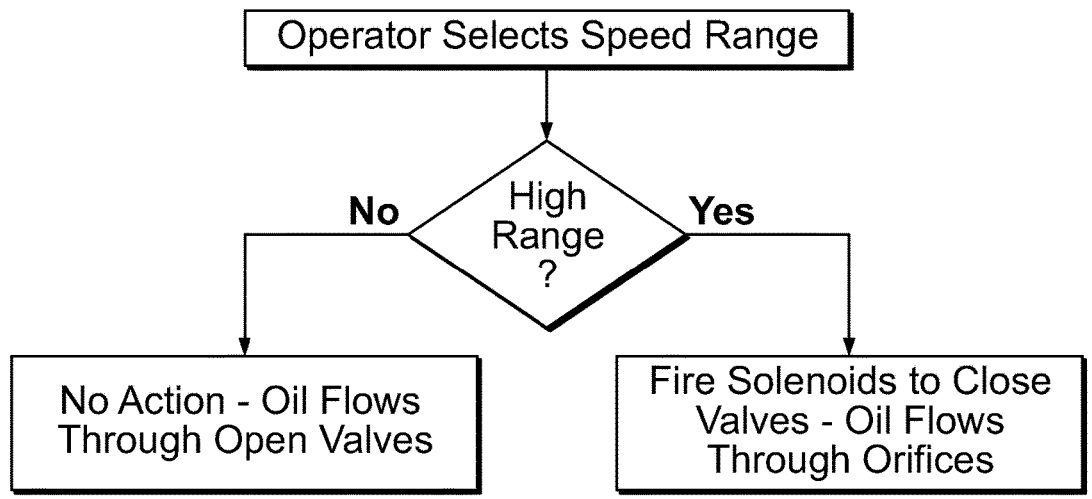
FIGS. 10 and 11 depict a flow chart for a controller and operator interface that can be used in parallel with the hydraulic circuit.

FIG. 10 depicts a flow chart which illustrates the logic tree in a controller and software system that controls when and if the operator engages a high-speed operable mode. If the operator selects a high-speed operable mode from the cab of the windrower using the hydraulic circuit depicted in FIG. 5, the selection activates the solenoid valves to close, thereby directing fluid through the restrictive orifices. In high speed operable mode, the hydraulic state is synchronized to a hydraulic state in which the restrictive orifices create a high dampening force, which prevents vibration and shimmying of the rear suspension.

Figure 11:
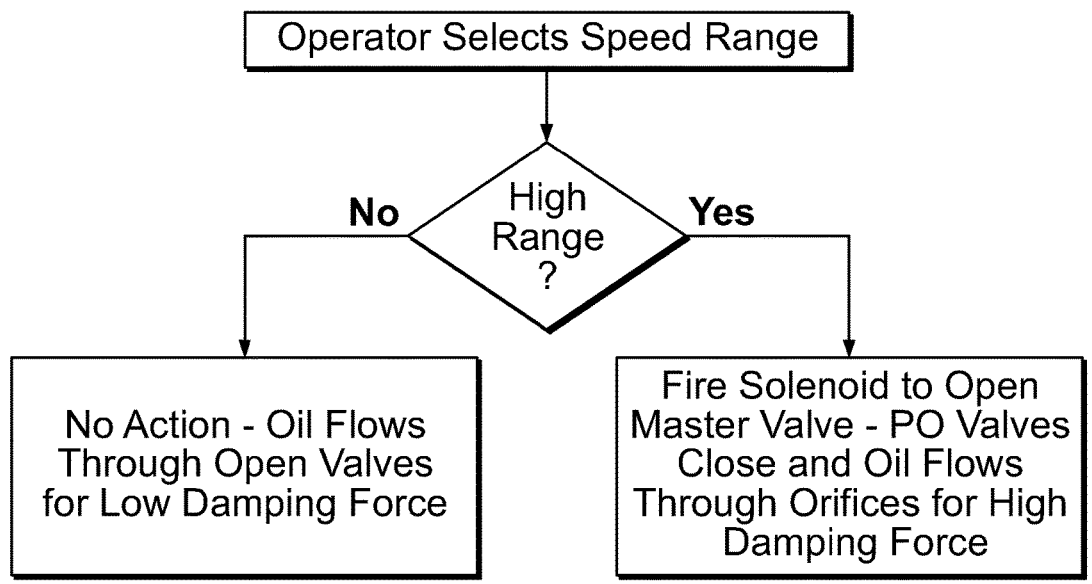

FIG. 11 depicts a flow chart which illustrates the logic tree in a controller and software system that controls when and if the operator engages a high-speed operable mode. If the operator selects a high-speed operable mode from the cab of the windrower using the hydraulic circuit depicted in FIG. 8, the selection activates the pilot valves to close, thereby directing fluid through the restrictive orifices. In high speed operable mode, the hydraulic state is synchronized to a hydraulic state in which the restrictive orifices create a high dampening force, which prevents vibration and shimmying of the rear suspension.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A harvester comprising:
   a vehicle frame configured for attachment to an implement to be moved in a longitudinal working direction across the ground;
   at least one rear axle positioned transversely to the longitudinal working direction of the harvester and operably attached to the vehicle frame;
   a first pair of actuator mounting brackets mounted on the axle by at least one fastening member at positions spaced transversely and on the axle, each actuator mounting bracket operably attached to a caster oppositely positioned below the axle;
   a first pair of ground wheels mounted on the casters;
   a pair of hydraulic actuators, each in fluid communication with at least one hydraulic circuit and operably mounted on the actuator mounting brackets configured for absorbing vibration from the casters during operation of the harvester in one or more operable modes;
   wherein the one or more operable modes comprise a first operable mode in which the harvester operates at a speed of from about 0 to about 15 miles per hour; and a second operable mode in which the harvester operates at a speed of from about 16 to about 30 miles per hour.

2. The harvester of claim 1, further comprising a ballast box attached by at least one fastening member to the rear edge of the frame.

3. The harvester of claim 1 further comprising a hydraulic fluid reservoir and a hydraulic valve manifold comprising the hydraulic circuit.

4. The harvester of claim 1, wherein the ground wheels are mounted on the casters with a pivotal attachment allowing independent pivotal movement about a vertical or substantially vertical axis along the center line of the pivotal attachment.

5. The harvester of claim 1, wherein the harvester is chosen from: a windrower, a lawn mower a hay forester, or a tractor.

6. The harvester of claim 1, wherein the hydraulic actuator is a single rod hydraulic actuator.

7. The harvester of claim 1, wherein the hydraulic actuator is a double rod hydraulic actuator.

8. A harvester comprising:
   a vehicle frame configured for attachment to an implement to be moved in a longitudinal working direction across the ground;
   at least one rear axle positioned transversely to the longitudinal working direction of the harvester and operably attached to the vehicle frame;
   a first pair of actuator mounting brackets mounted on the axle by at least one fastening member at positions spaced transversely and on the axle, each actuator mounting bracket operably attached to a caster oppositely positioned below the axle;
   a first pair of ground wheels mounted on the casters;
   a pair of hydraulic actuators, each in fluid communication with at least one hydraulic circuit and operably mounted on the actuator mounting brackets configured for absorbing vibration from the casters during operation of the harvester in one or more operable modes;
   wherein each hydraulic actuator comprises at least one fluid opening at one end of the hydraulic actuator that allows pressurized fluid to enter or exit the hydraulic actuator and displace a volume on one side of an actuator cylinder; and
   wherein the hydraulic circuit comprises:
   a source of pressurized fluid in fluid communication with at least the first fluid opening for supplying fluid to an returning fluid from the hydraulic actuator in the hydraulic circuit;
   a fluid stop valve in fluid communication with the source of pressurized fluid and the hydraulic actuator;
   a restrictive orifice positioned in parallel to the fluid stop valve within the circuit;
   a first and a second hydraulic state; whereby, in the first hydraulic state, the fluid stop valve is open allowing flow of pressurized fluid to and from the source of pressurized fluid and to and from the hydraulic actuator, in either configuration, without flow of pressurized fluid through the restrictive orifice; and whereby, in the second hydraulic state, the fluid stop valve is closed diverting flow of pressurized fluid form at least one actuator through the first fluid opening, through the restrictive orifice and subsequently into the source of pressurized fluid, wherein the restrictive orifice allows minimal flow in the hydraulic circuit thereby substantially increasing the damping force on the caster.

9. The harvester of claim 8, wherein the hydraulic controller further comprises a fluid controller, optionally integrated within the stop valve, that controls the flow of pressurized fluid through the fluid stop valve from the source of pressurized fluid or from the hydraulic actuator; said fluid controller is programmed to allow pressurized fluid flow through the fluid stop valve in the first hydraulic state, stop pressurized fluid flow through the fluid stop valve in the second hydraulic state, and wherein transition from the first to second hydraulic state is dependent upon movement of at least one caster and/or caster wheel.

10. The harvester of claim 9, wherein the harvester comprises a separate hydraulic circuit for each caster in the harvester, such that the one hydraulic circuits can dampen one of the caster's movement independent of the other caster hydraulic circuit and the other caster to which the other hydraulic circuit is operably attached.

11. The harvester of claim 9, wherein the fluid controller is a solenoid programmed to be energized and to close the fluid stop valve upon transition from the first to second hydraulic state.

12. The harvester of claim 8, wherein transition from the first to second hydraulic state is dependent upon movement of at least one caster and/or caster wheel.

13. The harvester of claim 8, wherein the one or more operable modes comprise a first operable mode in which the harvester operates at a speed of from about 0 to about 15 miles per hour; and a second operable mode in which the harvester operates at a speed of from about 16 to about 30 miles per hour; and wherein the wherein transition from the first to second hydraulic state is dependent upon transition from the first operable mode to the second operable mode.

14. A method of damping vibration in a harvester comprising
   a vehicle frame configured for attachment to an implement to be moved in a longitudinal working direction across the ground;
   a rear axle positioned transversely to the longitudinal working direction of the harvester and operably attached to the vehicle frame;
   a first pair of actuator mounting brackets mounted on the axle by at least one fastening member at positions spaced transversely and on either end of a center line of the axle, each actuator mounting bracket operably attached to a caster oppositely positioned below the axle;

a first pair of ground wheels mounted on the casters for independent pivotal movement about a substantially vertical axis along the center line of the harvester;

a pair of hydraulic actuators, each in fluid communication with a hydraulic circuit and operably mounted on the actuator mounting brackets;

the method comprising operating the harvester;

absorbing vibration from the casters through the hydraulic actuators;

transitioning the hydraulic circuit from a first hydraulic state to a second hydraulic state; wherein said first hydraulic state comprises diverting pressurized fluid in the circuit from at least one restrictive orifice, thereby maintaining a flow of pressurized fluid from a reservoir in the circuit to the hydraulic actuator.

15. The method of claim 14, further comprising providing information to an operator via an operator interface about whether the harvester is in a field operating mode or a high-speed mode.

16. A dampening system, configured for operation on a harvester comprising at least one axle, comprising:

at least one caster positioned beneath the axle;

at least one actuator mounting bracket configured for being mounted on the axle of the harvester by at least one fastening member at a position between one end or proximate to one end of the axle and the caster positioned below the axle;

a hydraulic actuator, in fluid communication with at least one hydraulic circuit and operably mounted on the actuator mounting bracket, said hydraulic actuator configured for absorbing vibration from the caster during operation of the harvester in one or more operable modes.

17. The dampening system of claim 16, wherein the dampening system comprises one rear axle positioned transversely to the longitudinal working direction of the harvester and configured for attachment to a frame of the harvester.

18. The dampening system of claim 16, wherein the dampening system comprises a right-hand and left-hand rear axle positioned transversely to the longitudinal working direction of the harvester and each configured for attachment to a frame of the harvester.

19. The dampening system of claim 16, wherein the dampening system comprises:

a pair of oppositely positioned rear suspended axles;

a pair of oppositely positioned actuator mounting brackets mechanically linked to the axles at a position spaced transversely from the center of the longitudnal axis defined by horizontal plane of each axle;

a pair of oppositely positioned casters operably linked to the actuator mounting brackets below the rear suspended axles configured for mounting a wheel assembly of the harvester;

a pair of oppositely positioned hydraulic actuators operably linked to the actuator mounting brackets and the axles, each hydraulic actuator in fluid communication with at least one hydraulic circuit;

wherein each hydraulic actuator is configured for absorbing vibration from each caster during operation of the harvester in one or more operable modes.

20. A kit comprising:

at least one actuator mounting bracket configured for being mounted on the axle of a harvester by at least one fastening member at a position between at or proximate to one end of an axle of the harvester and a caster positioned below the axle;

at least one hydraulic actuator;

at least one hydraulic circuit comprising a hydraulic circuit manifold;

wherein the hydraulic circuit manifold and the hydraulic actuator are configured for fluid communication with each other and a hydraulic circuit in a harvester; and wherein the hydraulic actuator is configured for attachment to the actuator mounting bracket or the axle a software program product that is configured for use with a software system of the harvester and comprises executable code that executes transition of the hydraulic circuit between a first hydraulic state and a second hydraulic state;

said first hydraulic state comprising diverting pressurized fluid in the circuit from at least one restrictive orifice, thereby maintaining a flow of pressurized fluid from a reservoir in the circuit to the hydraulic actuator;

said second hydraulic state comprising allowing pressurized fluid through the restrictive orifice, thereby decreasing the flow of pressurized fluid in the circuit.

21. The kit of claim 20, wherein the software program product comprises executable code that executes transition of the hydraulic circuit between a first hydraulic state and a second hydraulic state in synchrony or substantial synchrony with transition between a low-speed operable mode and a high speed operable mode of the harvester.

* * * * *